United States Patent
Kayanakis et al.

US006959873B2

(10) Patent No.: US 6,959,873 B2
(45) Date of Patent: Nov. 1, 2005

(54) ELECTRONIC CASH SYSTEM FOR AN ELECTRONIC WALLET

(75) Inventors: Georges Kayanakis, Sophia Antipolis (FR); Eric Gerbault, Vence (FR)

(73) Assignee: ASK, S.A., Valbonne (FR)

( * ) Notice: Subject to any disclaimer, the term of this patent is extended or adjusted under 35 U.S.C. 154(b) by 0 days.

(21) Appl. No.: 10/250,316

(22) PCT Filed: Jul. 9, 2002

(86) PCT No.: PCT/FR02/02407

§ 371 (c)(1),
(2), (4) Date: Jun. 30, 2003

(87) PCT Pub. No.: WO03/007201

PCT Pub. Date: Jan. 23, 2003

(65) Prior Publication Data

US 2004/0056082 A1 Mar. 25, 2004

(30) Foreign Application Priority Data

Jul. 9, 2001 (FR) .............................. 01 09102

(51) Int. Cl.[7] .............................................. G06K 19/06
(52) U.S. Cl. ...................... 235/492; 235/487; 235/383; 235/380; 235/381
(58) Field of Search ................................ 235/375, 379, 235/380, 381, 383, 451, 487, 192; 705/39, 40

(56) References Cited

U.S. PATENT DOCUMENTS

| | | | |
|---|---|---|---|
| 5,744,787 A | * 4/1998 | Teicher ....................... 235/380 |
| 6,021,944 A | * 2/2000 | Arakaki ....................... 235/380 |
| 6,065,675 A | * 5/2000 | Teicher ....................... 235/380 |
| 6,112,984 A | 9/2000 | Snavely ....................... 235/379 |
| 6,142,369 A | * 11/2000 | Jonstromer ................... 235/380 |
| 6,250,557 B1 | * 6/2001 | Forslund et al. ............. 235/492 |
| 6,439,455 B1 | * 8/2002 | Everett et al. .............. 235/379 |
| 6,505,772 B1 | * 1/2003 | Mollett et al. .............. 235/379 |
| 6,510,983 B2 | * 1/2003 | Horowitz et al. ............ 235/380 |

FOREIGN PATENT DOCUMENTS

| | | |
|---|---|---|
| EP | 0 421 808 | 4/1991 |
| EP | 0 797 174 | 9/1997 |
| WO | WO 00/62261 | 10/2000 |

* cited by examiner

*Primary Examiner*—Steven S. Paik
(74) *Attorney, Agent, or Firm*—James C. Lydon

(57) ABSTRACT

Electronic purse payment system in the form of a smart card in which payment of a purchase in a shop is performed by a payment terminal (20), by deducting the purchase amount from the amount in purse memory, the payment terminal being connected to a bank system including an authorization center (22), an acquisition system (24) for collecting all transactions made using the payment terminal and a centralized compensation system (26). The system includes an electronic till (14) located where the transaction occurs including at least a reading/writing device (40), a microprocessor (36), a memory (38) and a security application module (42) for giving authorization to perform the transaction, the purse memory being increased equal to the purchase amount when the purse memory is read by the reading/writing device so that management of a transaction made at the shop is achieved at the transaction location.

10 Claims, 2 Drawing Sheets

ELECTRONIC CASH SYSTEM FOR AN ELECTRONIC WALLET

This application s a U.S. National Stage of International Application PCT/FR02/02407, filed Jul. 9, 2002 and published on Jan. 23, 2003 in the French Language.

TECHNICAL FIELD

This invention concerns an electronic till system enabling the debit and recharge of an electronic purse containing a certain amount of money in the form of electronic value (EV) and specifically concerns an electronic till system for electronic purses.

BACKGROUND

The bank card (BC) system allows payment to be made for the purchase of products or services. The credit authorization amount of each card depends on many factors such as the solvency of its owner, the type of contract between the owner of the card and the issuing bank, etc. The credit authorization limit thus varies according to the various types of cards and may involve considerable sums of money. Admittedly, this credit authorization limit offers the card holder the advantage of being able to make purchases for amounts that may be higher than the balance of his/her bank card at the time of the purchase. However, in the case of certain stolen or counterfeit cards, this system enables the thief or fraudulent individual to make several cash withdrawals or purchases on the card holder's account without there being a limit to the amount of withdrawals or purchases.

In order to avoid these drawbacks, an electronic purse (EP) system has been developed. This system allows a certain amount of money to be recharged and the purchase of products and services of an amount less than or equal to the sum of money remaining.

Generally speaking, electronic purses resemble traditional smart cards and thus consist of a plastic card body in which an electronic module is inserted and designed to be connected to a reader.

EPs are disposable or rechargeable. In the case of disposable EPs, the electronic module is essentially made up of a single memory whose contents, representing the available balance, is decremented by the amount of the transaction made each time it is used and until the balance remaining is zero. This type of electronic purse operates in exactly the same manner as a prepaid telephone card. The structure of the rechargeable EP is more complex as it features a rewritable memory in which a balance file is defined, the content of which is, as for the disposable EP, decremented after each transaction or, on the contrary, incremented by the amount of the sum recharged; all of these operations being controlled by a microprocessor and with a degree of security which does not exist in disposable EPs.

The rechargeable EP management system requires an acquisition and recharge system and a system which allows the circulation of the electronic money to be controlled. At present, existing EP systems require a new architecture in relation to the already existing bank card system. The EP management system requires a system which controls both electronic value acquisition and emission. Furthermore, the bank must be able to establish a daily log of the EP and thus to establish electronic value circulation traceability so that the difference between the balance of the emission system and the acquisition system are always positive or at least equal to zero, what is carried out by establishing a mirror account. The document EP 0.797.174 describes such management system by simplifying it since there is deletion of the account called "pool account". However, this system has always the drawback of using a centralized management at the bank level.

In addition, a secure debit and credit system must be established at all levels, for which the main system consists in transferring money in a SAM (Security Application Module). The security module also acts at the emission level, acquisition and recharge systems and the recharge and payment terminals. Its installation requires that new modules, new software and new connections be established.

Existing bank card management systems are based on a simple collection and authorization system. Unlike the EP system, money does not circulate although a bank to bank compensation system is in operation. The compensation system consists in using an acquisition system to collect the individual transactions made on the withdrawal and payment terminals in stores, and then to transfer the money by conversion between the bank card holder's bank account and the shopkeeper's bank account. The authorization system consists in checking whether the card is "valid" and whether the cardholder is solvent. This scheme does not require the installation of a security module.

The EP systems currently developed are thus complex to implement as they require a new architecture in relation to the already-existing bank card system and a complex secure management system.

SUMMARY OF THE INVENTION

This is why the object of the invention is to provide an electronic till EP management system which enables the debit and the recharge of an electronic purse in a store without requiring any complex secure management system nor a new architecture in relation to the existing bank card system.

The purpose of the invention thus concerns an electronic purse payment system in the form of a smart card or a similar device in which the payment of a purchase in a shop, called a transaction, is carried out by a payment terminal, by deducting the amount of his/her purchase made by the holder of the electronic purse from the amount remaining in the memory of the electronic purse, the payment terminal being connected to a bank system of the type comprising an authorization center, an acquisition system for collecting all the transactions made using the payment terminal and a centralized compensation system. According to an essential aspect, the system includes an electronic till device located where the transaction takes place including at least a reading/writing device to read/write into the memory of the electronic purse, a microprocessor, a memory and a security application module for giving to the microprocessor the authorization to perform the transaction, the contents of the memory of the electronic till being increased of an amount equal to the amount of the purchase when the memory of the electronic purse is read by the reading/writing device so that the management of a transaction made at the shop is achieved at the location of the transaction.

BRIEF DESCRIPTION OF THE DRAWINGS

The purposes, objects and characteristics of the invention will become more apparent from the following description when taken in conjunction with the accompanying drawings in which.

DETAILED DESCRIPTION OF THE INVENTION

Figure 1:
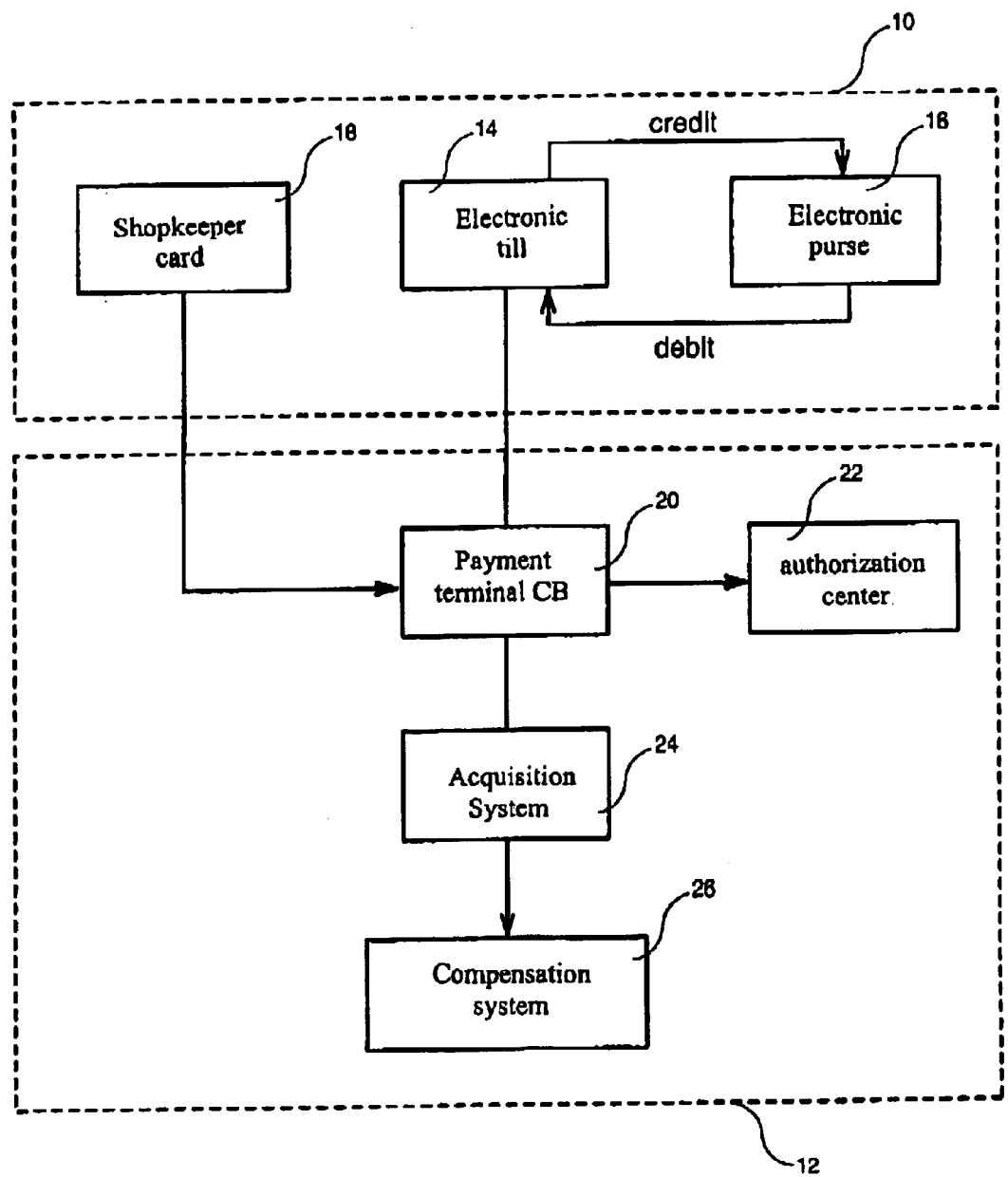
FIG. 1 represents the complete diagram of the electronic purse system according to a preferred embodiment of the invention.

According to FIG. 1, the electronic purse system (PME) according to a preferred embodiment of the invention includes the circuit used by the existing bank which is the card system 12, but which could be any other equivalent system; and an assembly 10 which includes an electronic till 14 which interfaces with the electronic purse 16 and a bank card payment terminal 20, and the shopkeeper card 18 which interfaces with the bank card payment terminal 20 to conduct transaction on the existing bank card circuit. The assembly 10 is described in detail in FIG. 2.

The existing bank card system 12, and in particular the existing CB system 12, is based on a simple collection and authorization system. A bank card, which represents the central element of the bank card system's functional architecture, enables its holder to pay for products and services by means of a payment terminal 20 in a store. An authorization center 22 primarily includes a function designed to verify the validity of the card and to check the solvency of the card holder when the amount of the purchase exceeds a certain amount. The payment terminal is regularly connected to the bank card circuit by means of the switched telephone network (STN) and once the shopkeeper has introduced his/her shopkeeper card 18 into the bank card payment terminal 20. An acquisition system 24 collects all of the transactions made using the payment terminal 20. A compensation system 26 then transfers the electronic money, without the actual circulation of money taking place, from the bank card holder's bank account to the shopkeeper's bank account.

Figure 2:
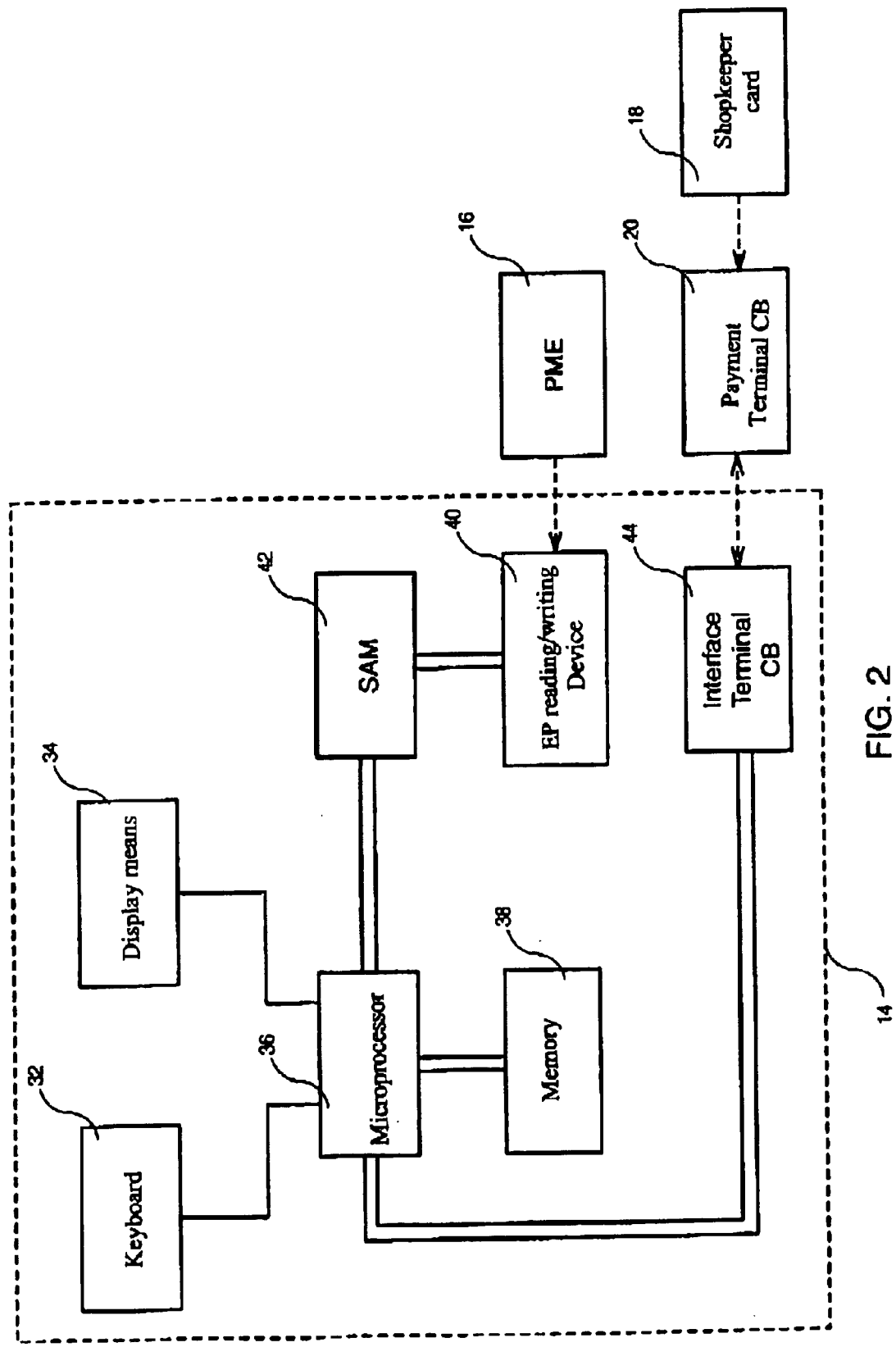
FIG. 2 is a block diagram of the electronic till according to the invention.

In FIG. 2, the electronic till 14 consists of a keyboard 32 and a display means 34 which enables transactions with the EPs to take place, a microprocessor 36 and a memory 38. The memory 38 is a rewritable memory in which a balance file is defined, the contents of which is decremented after each transaction or, on the contrary, incremented by the amount of the sum recharged, all of these operations being controlled by the microprocessor 36. It should be noted that the debit or the recharging operations of the EP performed using the keyboard 32 and the display means 34 of the electronic till, may also be accomplished by using the keyboard and the screen of the payment terminal 20 if the latter is designed to do so.

The electronic till 14 is equipped with an EP reading/writing device 40 connected to microprocessor 36, in this embodiment, by a security application module (SAM) 42. The bank card payment terminal 20 is connected to microprocessor 36 by means of an interface 44. The SAM 42 is a physical or logical function of the system and ensures secure storage of data such as the electronic value, encryption keys for the transfer of secure data, and also the authorization to perform the transaction. It must be noted that this functionality could be implemented by a software run in microprocessor 36.

The EP reading/writing device 40 allows EPs to be read by contact or by insertion into a slot. According to another embodiment of the invention, the EP is a contactless card equipped with a built-in antenna and the reading/writing device 40 is also equipped with an antenna to enable electronic signals to be exchanged and to thus enable contactless EPs to be read by electronic coupling. The EP is read by the reading/writing device 40 in order to pay for products or services or to recharge the EP. By inserting the shopkeeper card 18, which is a special bank card type authorization card, into the payment terminal 20, the shopkeeper can transfer the electronic value accumulated in the electronic till 14 to his/her bank account. Conversely, he/she can obtain the money from his/her bank and recharge the electronic till 14 by converting money into EV. When products or services are purchased, the shopkeeper obtains an amount of EV corresponding to the value of the products or services provided to the EP cardholder, which he/she returns to his/her bank in the form of money. In order to guard against the creation of electronic money or the laundering of money, the electronic till cannot issue more EVs than it contains and can only store a limited amount of EVs. The interface 44 between the electronic till 14 and the bank card payment terminal 20 can be either a permanent link, or a link which is established when the electronic till is connected to the terminal. In this case, the electronic till has a card-shaped interface which is inserted into the slot of the terminal.

Among the numerous advantages of the system according to the invention, the electronic till establishes electronic value circulation traceabilty itself. In this manner, the mirror account established in the bank for managing existing EP systems is no longer necessary.

According to an embodiment of the invention, the acquisition system 24 is the bank card system that is common to the banks' economic interest group.

In addition, the system according to the invention is decentralized and may thus be used by a merchant cartel or by a private chain. In this case, the circuit used is no longer the bank card circuit but a specific circuit enabling shopkeepers of the cartel or at different points of sale of the private chain to be able to conduct transactions with the EP holders having authorization from the cartel or the private chain.

Advantageously, the installation of the system according to the invention requires only the modification of the payment terminals by adding the EP interface or electronic till and by the use of the shopkeeper card of the existing bank card system for managing the EPs.

What is claimed is:

1. An electronic purse payment system in the form of a smart card in which the payment of a purchase in a shop, called a transaction, is carried out by a payment terminal, by deducting the amount of his/her purchase made by the holder of the electronic purse from the amount remaining in the memory of said electronic purse, said payment terminal being connected to a bank system comprising an authorization center, an acquisition system for collecting all the transactions made using said payment terminal and a centralized compensation system; wherein said electronic purse payment system further includes an electronic till device located where said transaction takes place including at least a reading/writing device to read/write into the memory of said electronic purse, a microprocessor, a memory and a security application module for giving to said microprocessor the authorization to perform said transaction, the contents of the memory of said electronic till being increased by an amount equal to the amount of the purchase when the memory of said electronic purse is read by said reading/writing device so that the management of a transaction made at the shop is achieved at the location of the transaction, wherein said security application module ensures storage of data corresponding to an electronic value, encryption keys for transfer of secure data, and authorization to perform the transaction, wherein said payment terminal is adapted to receive a shopkeeper's card, and wherein said shopkeeper's card is capable of authorizing a transfer of electronic value accumulated in said electronic till device to the shopkeeper's bank account.

2. The electronic purse payment system of claim 1, wherein said reading/writing device is adapted to perform the recharge of said electronic purse by increasing the amount remaining in its memory under the control of said microprocessor, the contents of the memory of said electronic till being then decreased of an amount equal to the amount of the recharge of said electronic purse.

3. The electronic purse payment system of claim 2, wherein said acquisition system is a system for collecting the transactions made using said payment terminal and said compensation system is adapted to make the compensation between the shop bank account and the electronic purse holder's bank account.

4. The electronic purse payment system of claim 3, wherein said acquisition system is the bank card system that is common to the economic interest group of the bank.

5. The electronic purse payment system of claim 2, wherein said acquisition system is a system which is specific to a private chain having payment terminals enabling many authorized holders of electronic purses to pay for their purchases at the various points of sale of said private chain.

6. The electronic purse payment system of claim 2, wherein said acquisition system is a decentralized system specific to a merchant cartel.

7. The electronic purse payment system of claim 2, wherein said electronic till device includes a keyboard and a display means to conduct said debit and recharge operations.

8. The electronic purse payment system of claim 7, wherein said electronic till device is connected by a permanent link to the payment terminal.

9. The electronic purse payment system of claim 8, wherein said electronic till device has an interface having the shape of a card designed to be inserted into the slot of the payment terminal.

10. The electronic purse payment system of claim 1, wherein shopkeeper's card is capable of authorizing conversion of money in the shopkeeper's bank account into electronic value which is deposited into said electronic till.

* * * * *